United States Patent [19]

Mieth

[11] Patent Number: 5,435,853
[45] Date of Patent: Jul. 25, 1995

[54] PROCESS FOR CLEANING THE SEATS OF DOUBLE SEAT VALVES

[76] Inventor: Hans O. Mieth, Sandkrug 3, D-2058 Schnakenbek, Germany

[21] Appl. No.: 39,443
[22] PCT Filed: Oct. 10, 1991
[86] PCT No.: PCT/EP91/01984
    § 371 Date: Apr. 30, 1993
    § 102(e) Date: Apr. 30, 1993
[87] PCT Pub. No.: WO92/08070
    PCT Pub. Date: May 14, 1992

[30] Foreign Application Priority Data

Nov. 3, 1990 [DE] Germany .................. 40 35 017.7

[51] Int. Cl.⁶ .............................................. B08B 7/00
[52] U.S. Cl. .......................................... 134/8; 134/18; 134/22.1; 134/42
[58] Field of Search .................... 134/8, 22.1, 18, 42

[56] References Cited

FOREIGN PATENT DOCUMENTS

| | | |
|---|---|---|
| 0202126 | 1/1987 | European Pat. Off. . |
| 8003805 | 3/1980 | Germany . |
| 3108973 | 10/1982 | Germany . |
| 3133273 | 3/1983 | Germany . |

Primary Examiner—Sam Silverberg
Assistant Examiner—Zeinab El-Arini
Attorney, Agent, or Firm—Lane, Aitken & McCann

[57] ABSTRACT

A process for cleaning the seats of a double seat valve having two independently movable closing elements, each of the closing elements being associated with a respective one of the valve seats, which closing elements can be moved into simultaneous fully open positions when the double seat valve is in an open state, and at least one of the closing elements is movable to a partly open position independently of the other closing element, in which partly open position a passage is defined between said at least one closing element and the seat associated with said at least one closing element, comprising: periodically alternately moving said at least one closing element to the partly open position and reversing the moving to move said at least one closing element to the closed position in partial stroke movements, the reversing of partial stroke movements of the closing elements from opening to closing movement and from closing to opening movement is done by a control unit in response to the passage of time, to the closing elements attaining predetermined positions, or as a function of the flow of cleaning agent.

10 Claims, 2 Drawing Sheets

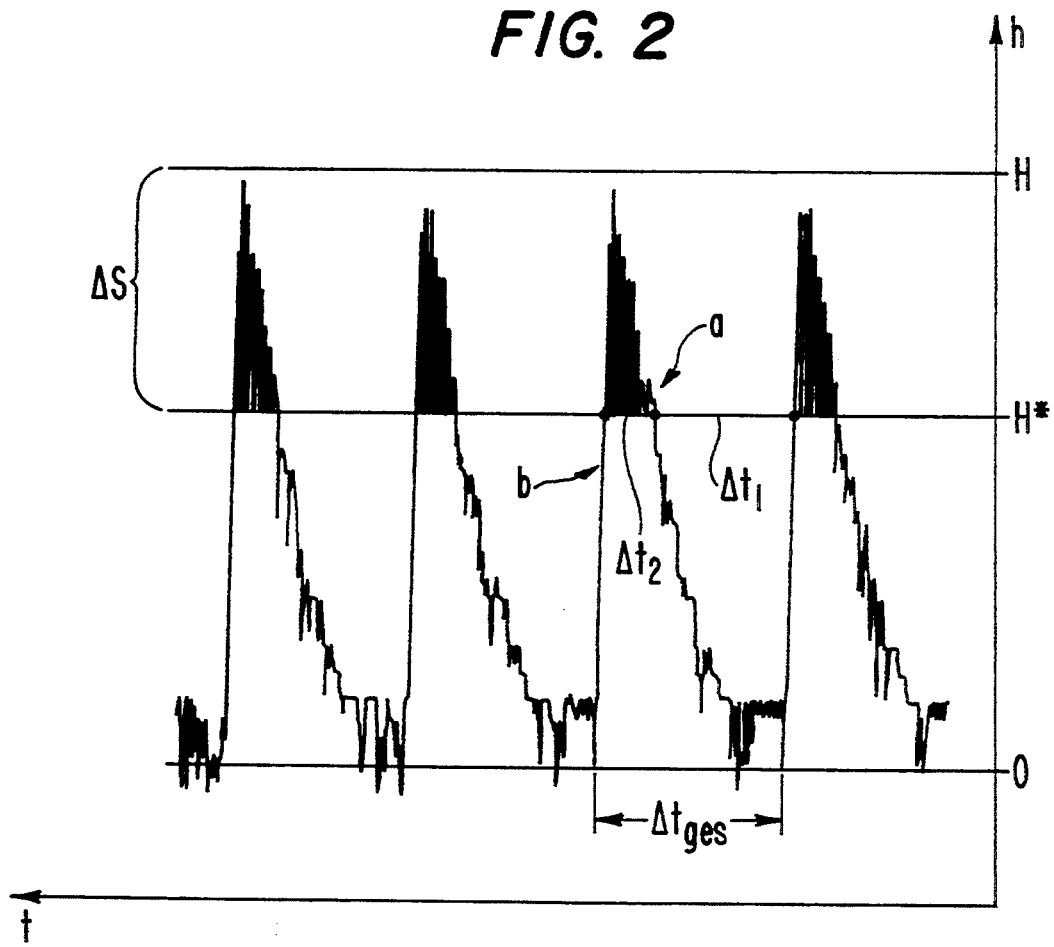

PROCESS FOR CLEANING THE SEATS OF DOUBLE SEAT VALVES

BACKGROUND OF THE INVENTION

The invention relates to a process for cleaning the seats of double seat valves and to a control device for applying the process.

A number of control devices of the class characterized above are known [DE 80 03 805 U1, DE 31 08 973 C2, and DE 31 33 273 (2)], all of which embody the same principle of operation. According to this principle, the driving piston of the closing element adjusting rod of the closing element to be lifted within the individual adjustment device is caused to strike a lift limit stop. In this situation the drive piston stop position can be varied within limits by movable stops inside the individual movement device (DE 80 03 805 U1), or again the stop position may be varied relative to the closing element adjusting rod (DE 31 00 973 C2). In the state-of-the-art control device known from DE 80 03 805 U1, the individual adjustment devices are integrated into the primary adjustment device in such a way that one is positioned at the upper and the other at the lower end of the primary adjustment device.

In the control device known from DE 31 08 973 C2, the two closing element adjustment rods are guided upward by the primary adjustment device and end in a control cylinder common to both individual adjustment devices. Lastly, DE 31 33 273 C2 describes a control device in which the individual adjustment devices for both closing elements are introduced additively below the primary adjustment device generating the full stroke for the full open position as an independent adjustment device without modification to the adjacent standard components, between primary adjustment device and spacer housing.

The complexity of the state-of-the-art double seat valves for which seat cleaning may be effected is suggestive of the difficulties that may be encountered in presetting of the stop positions for the drive pistons of the individual adjustment devices. One difficulty is the sum of the manufacturing tolerances of a great number of relevant components necessitating in each instance individual adjustment of the individual strokes, to be added to which is the fact that a check must always be made to determine if the basic operation of the double seat valve is still ensured within the potential partial stroke adjustment range. Specifically, it is necessary in all cases to prevent displacement of the other closing element to a partly open position when one of the closing elements is lifted for the purpose of cleaning the seat of the element. Secondly, the valve seat cleaning processes that can be carried out with state-of-the-art control devices exhibit a fundamental disadvantage resulting from stationary retention of a partly open position of a particular closing element, once this position has been reached, until the valve seat cleaning process has been ended by a control signal fed externally to the double seat valve. Since the drive piston of the individual adjustment device is caused to strike a stop position, as has already been pointed out, a more or less large passage cross section is available for the cleaning agent over the entire duration of the particular seat cleaning process. The pressure and temperature conditions to which double seat valves of the class indicated in the foregoing are subjected in practical applications may either reduce or enlarge the passage cross sections that have been produced. A reduction may cause inadequate seat cleaning, while in all cases enlargement results in higher cleaning agent consumption, without the cleaning effect necessarily being increased as a result. Especially in the event of a large number of double seat valves to be cleaned simultaneously, as for example within a valve block, this latter aspect necessitates generation of a too high and thus cost ineffective cleaning output, without achievement at least of intensification of the seat cleaning process or seat cleaning of equal intensity for all double seat valves.

In connection with a state-of-the-art process for realization of a leakage free connecting double seat valve for which seat cleaning is possible (EP 0 208 126 B1), in which a closing element designed as a slide displaced in the direction of a valve housing element, such as one guiding a product, for the purpose of cleaning the valve seat, the other closing element, designed as a seat plate, being displaced simultaneously relative to the element, such as one acted upon by a product, by the amount of a partial stroke in the same or opposite direction, it has admittedly been proposed that the seat cleaning process be effected by repeated partial stroke movements of the closing elements. The purpose of this measure was primarily to free the seat surface of the closing element designed as a slide and in the process to apply a film of cleaning agent between the seal seat and seat surface as well, by means of repeated wiping. The critical area between seat seal and seat surface of the closing element, such as one acted upon by a product, could not be cleaned reliably exclusively by a single opening stroke. But even in this state-of-the-art process, the drive pistons of the individual adjustment devices are caused to strike against a fixed stop position, which is retained until a control signal supplied from outside the double seat valve ends the lifted position over the duration of which the entire passage cross section is available for cleaning agent flow.

SUMMARY OF THE INVENTION

The object of this invention is to increase the cost effectiveness in a process for cleaning the seats of double seat valves of the class described in the foregoing, to improve the cleaning effect, and also to simplify the devices employed for generation of a partial stroke.

The advantages of the proposed process and of the control device employed for application of the process are obvious. Since the change of direction of the closing element, the reversal of its opening and closing movement, occurs periodically, the flow of cleaning agent increases over the passage cross section, continually varying from a minimum to a maximum amount between closing element and associated valve seat, thus triggering a particularly intensive cleaning action. The mechanical action of the flow is heightened with increase in the rate of flow in the narrowing gap, while separation phenomena and eddy currents occur with greater intensity with enlargement of the passage cross section, this promoting separation and removal of separated fouling substances.

The process is further characterized by three process alternatives as regards reversal of movement from opening to closing. One option is to make reversal dependent exclusively on time, in which case an advantageous implementation of the process provides for generation of the control signals either by a main control unit mounted outside the double seat valve or by a control unit mounted on the double seat valve and associated exclusively with it. The stroke-dependent solution consists either of introducing reversal of the closing element when a specific stroke position has been reached or of deriving the control signals for reversal directly from the behavior of a detectable physical quantity corresponding to the stroke-time behavior. An example of such a quantity is the pressure of the pressure means for these individual adjustment devices used to generate the partly open position; this pressure impinges on a pressure sensor or pressure switch and triggers the control signals by way of these elements. The third alternative solution involves making the reversal of direction of the closing element dependent on the flow of cleaning agent; specifically, the closing movement is introduced if cleaning agent flows through an aperture gap, while the opening movement is initiated if cleaning agent flow is absent. The control signals required for the sequencing of the periodically alternating opening and closing movements of the closing element and for reversal of direction are, as it were, generated by the proposed control device in both of the last-named alternative solutions (reversal controlled by stroke and result or by cleaning agent), and not, for example, by control signals introduced from the environment external to the double seat valve. Such is the case, for example, in time-dependent reversal when the control signals required are emitted by a main control units mounted outside the double seat valve. Another essential advantage of the measures proposed is represented by the fact that the entire control process may be effected without mechanical stroke limit stops, so that no movable stops requiring adjustment are now needed to ensure the stop position of a particular drive piston of an individual adjustment device. The new process may still be applied to advantage, however, if the control device for application of the process, as is provided by an advantageous embodiment, is provided with a mechanical stroke limit stop. As one alternative, this mechanical stroke limit stop may be represented by a safety stop for the particular closing element, one preventing the double seat valve from reaching its fully open position in the course of seat cleaning in the event of failure or defective operation of the control device. As another option, the stroke limit stop may be used systematically to limit mechanically the final stage of the opening movement, regardless of how reversal of the opening to closing movement, and vice versa, are accomplished.

In addition to the intensification of the seat cleaning process dependent on flow mechanics as described in the foregoing, improvement in cleaning of the critical areas between seat seal and closing element is achieved as a result of the fact that, because of the periodic opening and closing movements of the closing element as the cleaning agent acts, the seal is repeatedly deformed and worked, this resulting in micromovements of the seal relative to the closing element surfaces limiting the seal.

It is moreover in the nature of things that over the entire seat cleaning period a smaller amount of cleaning agent travels between an passage cross section periodically alternating between a minimum and a maximum value and an associated valve seat than a stroke partly open stationarily during the entire period over the maximum passage cross section. This advantage of the process proposed becomes particularly apparent when the seat areas of a large number of double seat valves are to be cleaned roughly at the same time, because it may then be assumed that the maximum throughputs for the individual valve are statistically distributed over time with the passage cross section fully open for a brief period, so that it is highly probable that a case will never arise in which all double seat valves to be cleaned roughly at the same time will require the maximum possible flow of cleaning agent. The pressure loss in the line connecting the sequentially engaged valves is thus limited, that is to say, the first and the last valves in the series undergo cleaning of more or less equal intensity.

An advantageous application of the process provides that the stroke-time behavior of the opening and closing movement of the closing element may be optionally and independently adjusted. By means of this measure, firstly, influence is exerted on the fluidic processes inside the aperture gap, and secondly, the passage cross section effectively active for the cleaning agent can thereby be controlled over the cleaning period.

The process proposed may be applied to all the control devices indicated in the foregoing, insofar as the arrangement of the individual adjustment devices, the varied embodiments of the closing element adjustment rods, and lastly the closing element embodiments are involved; the latter may be designed, for example, both as seat plates or both as closing elements designed as slides, or the one may be designed as a seat plate and the other as a slide. The closing element configurations may be designed with or without pressure equalization pistons.

In keeping with the three alternative processes proposed, control devices are proposed that are independent of each other. Achievement of the time-dependent reversal of the opening to closing movement and vice versa requires control signals that are generated by way of a time function element. This time function element may be contained in a main control element situated outside the double seat valve. However, it may also be mounted locally, that is, in or on the double seat valve, and is activated there only if the pertinent double seat valve is activated for seat cleaning. The closing element involved periodically executes opening and closing movements in response to the control signals emitted; the points of reversal of the closing and the opening movement may be positioned a specific distance from the surface of the seat or a stroke limiting stop that may be present. Situations are also possible, however, in which reversal points are situated precisely at the closing or stop position of the closing element or are mandatorily determined by this position.

The closing element adjustment rods are all provided with a position indicator for the purpose of production of the proposed control device accomplishing stroke-dependent reversal. This indicator may, for example, be in the form of cams or recesses acting mechanically on a slave positioner associated with the pertinent closing element adjustment rod. However, they may also be electric induction master positioners. Also suitable as slave positioners, on the other hand, are, for example, electric, compressed-air, or hydraulic switches which, as indicated in the foregoing, may be acted upon by mechanical or electric means. Provision is additionally made in the control device for control by the positioning element either of means for manipulation of drive energy for the individual adjustment device associated closing element adjustment device or for direct operation. Such means are customarily electrically, pneumatically, or hydraulically controlled positioning valves by means of which the pressure means, preferably compressed air, is delivered to the individual adjustment device or is forwarded from it.

It is obvious that the examples of embodiment of a control device for application of the process proposed presented in the context of this invention are exclusively of the nature of examples. The process may, of course, also be applied to other individual adjustment devices ultimately serving the purpose of generating an adjusting movement of any nature of the closing element (preferably translatory or rotatory) by way of its closing element adjustment rod. Purely electromotive or again hydraulic drives may be involved; the closing movement need not, as is customary, necessarily be of the nature of closing by spring action but may also be accomplished by the movement in the second direction of a drive acting two directions.

Nor is the process indicated restricted exclusively to the previously presented configurations of main adjustment device and individual adjustment devices such as reflect the state of the art. The process may rather also be applied to drives not previously applied in the case of double seat valves of the class described in the foregoing, ones such are described in previously referenced EP 0 208 126 B 1, for example.

BRIEF DESCRIPTION OF THE DRAWINGS

The process proposed and the control device for application of the process are described with reference to a preferred embodiment as illustrated in the figures of the drawing and described in greater detail below.

FIG. 2 shows a stroke-time pattern $h = f(t)$ of a closing element such as occurs in use of the control device shown in FIG. 1.

DETAILED DESCRIPTION OF THE DRAWINGS

Figure 1:
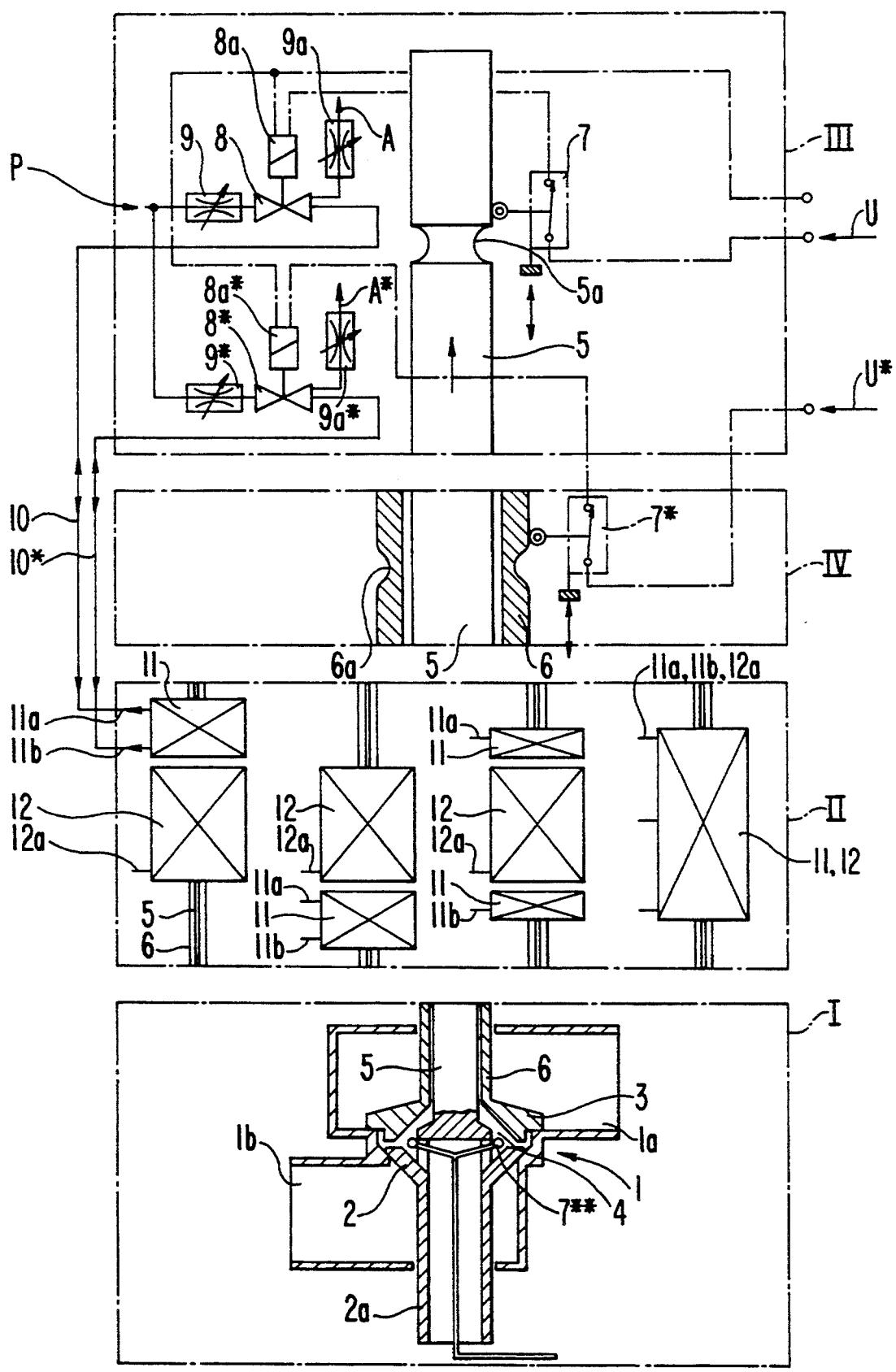
FIG. 1 presents a diagrammatic representation of a control device as applied to a double seat valve with two closing elements in the form of seat plates and in conjunction with possible layouts of main adjustment device and individual adjustment devices.

FIG. 1 shows four areas I to IV characterizing the double seat valve with the control device for application of the process proposed. Area I includes the double seat valve 1 in the area of its valve housing 1a, in an embodiment frequently employed, in which the closing elements 2 and 3 are designed as seat plates. In the position shown, the latter form between themselves and the valve housings 1a, 1b a leakage cavity 4 that is connected to the vicinity of the double seat valve by way of a pipe 2a connected to the subjacent closing element 2. Both closing elements 2 and 3 are actuated by a closing element adjusting rod 5 or 6, both of which extend upward from the valve housing 1a, the latter being designed as a hollow rod and concentrically enclosing the former.

The area II exhibits possible configurations of a main adjustment device 12 in communication with individual adjustment devices 11. As viewed from left to right, it is a question of a drive configuration such as is set forth in DE-PS 31 08 973, DE-PS 31 33 273, DE-GM 80 03 805, and EP 02 208 126. 11a and 11b designate a pressure means connection of the individual adjustment device 11, and 12a designates a pressure means connection of the main adjustment device. The closing element adjusting rods 5 and 6 are in all instances introduced into the drive configuration. The individual adjustment devices 11 are provided with and emptied of pressure means by way of pressure means lines 10, 10*.

The areas III and IV contain the control device proper for application of the process proposed, only detection of the stroke of the closing element adjusting rod 6 designed as a hollow rod being shown. A grooved recess 6a acts as master positioning element, while a position detector 7* is designed as a two-point electric switch mounted so as to be movable in the direction of the stroke. In the double seat valve as actually produced, the area IV is to be found where the closing element adjusting rod 6 designed as a hollow rod is accessible for the purpose of rod stroke detection.

In the area III, the stroke of the closing element adjusting rod 5 is detected by another positioning element 5a and a position indicated, as described above for the area IV. The first and the second position detectors 7 and 7* are acted upon by a control agent U or U* which is generally available as direct or alternating voltage. Means 8, 8a or 8*, 8a* are activated as desired by means of the control agent indicated for operation of the drive energy for the individual adjustment device 11 associated with the closing element adjusting rod 5 or 6. It is generally a question with the means indicated of electrically actuated positioning valves for pressure means, compressed air in particular, the electric drives being designated as 8a and 8a* and the positioning valves as 8 and 8*. The pressure means supply is designated as P; the pressure means itself is delivered to the positioning valve 8 or 8* by way of an adjustable choke 9 or 9* and discharged from the valve into the environment A or A* by way of a similar choke 9a or 9a*. The positioning valves 8 or 8* switch the pressure agent line 10 or 10* to the individual adjustment devices 11.

A signal generator 7** responding to the flow of cleaning agent and delivering control signals suitable for activating the drive 8a or 8a* of the positioning valve 8 or 8* is to be seen in area I in a position, as viewed in the direction of flow, beyond the valve seat to be cleaned. In the sample embodiment, it is in the leakage cavity 4.

The mode of operation of the control device is to be explained in conjunction with the stroke-time behavior $h = f(t)$ as illustrated in FIG. 2. The position detector 7, for example, is positioned in the direction of the stroke so that a larger partial stroke designated as H in FIG. 2 is set. The pattern of the opening stroke over time is designated as a, and that of the closing stroke b. The total time of a switching interval is designated as $\Delta t_{ges}$. It must be noted here that no mechanical stroke limiting stop whatever is employed in this instance to secure the greatest partial stroke H. If the closing element adjusting rod 5 is now moved upward far enough so that the positioning element 5a in the form of an annular groove actuates the position detector 7, operation of the drive 8a of the positioning valve 8 is interrupted as a result. The latter opens the pressure means line 10 leading to the environment A, and the pressure means can escape from the individual adjustment device 11. The closing element adjusting rod 5 and the closing element 2 connected to it now move downward. As soon as the positioning element 7a leaves the area of influence of the position detector 5a in the process of movement downward, the latter again activates the drive 8a, and the pressure means can flow again from the pressure means supply by way of the positioning valve 8 of the individual adjustment device 11 along the path through the pressure means line 10. The closing movement comes to a halt, the closing element 2 is on or in the vicinity of its seating surface, a reversal of direction takes place, followed by a repeated opening movement of the closing element 2. Both the supply and removal of pressure means into and from the individual adjustment device 11 can be acted upon by means of the adjustable choke 9 or 9a. It is possible thereby to act upon an increase in the opening stroke a or the closing stroke b in the stroke pattern over time. The increase may also be affected by additional storage devices, not shown or designated, that increase the volume of the individual adjustment devices 11. Whether or not the closing element 2 comes to rest at the end of its closing stroke on the metal, on the associated seating surface, depends essentially on the parameters selected that determine the periodic pattern of alternating opening and closing movements over time. In the case illustrated, in FIG. 2, brief metal contact occurs between closing element 2 and the associated valve seat, since the closing stroke b reaches the line identified by zero. H* in FIG. 2 designates the clearance stroke of the closing element 2 to the point of lifting of the seat seal away from the associated valve seat. This means that a passage cross section for the cleaning agent is available only from this point forward as the opening stroke continues. In the case in question the interval for the effective opening stroke amounts to S = H-H* As is also to be seen from FIG. 2, passage of cleaning agent to the area of the seat remains blocked over interval $\Delta t_1$, while cleaning of the seat with constantly varying passage cross section, increasing from zero to a maximum and then decreasing again to zero takes place over the interval $\Delta t_2$. The advantages obtainable with a seat cleaning process of this kind have already been discussed at length in the foregoing.

The pattern illustrated in FIG. 2 also makes it abundantly clear that additional opening intervals of other double seat valves also simultaneously subordinated to the proposed seat cleaning process may from the statistical viewpoint be placed in the area between the effective opening intervals, without the need for linear increase in the cleaning output to be made available with increase in the number of valves waiting for seat cleaning. If the positioning valves 8 or 8* are activated as a function of the flow of cleaning agent by a signal generator 7** responding to the flow of cleaning agent at a point beyond the valve seat to be cleaned, as viewed in the direction of flow, detection of the pertinent closing element stroke along the path over the position detectors 5a or 6a in conjunction with the position detector 7 or 7* is superfluous. As soon as a flow of cleaning agent is established as a result of effective opening of the passage gap between closing element 2 or 3 and the associated valve seat, a resulting signal from the signal generator 7** causes reversal of the opening to closing movement. Interruption of the flow of cleaning agent as the closing movement continues now results in a signal reversing the process, so that the sequence of periodically alternating opening and closing movements is ensured.

In order on the one hand of prevent transfer to the double seat valve to its fully open position during seat cleaning in the event of failure or defective operation of the control device, each individual adjustment device 11 is provided with a mechanical stop, not shown in the drawing that makes it possible to limit the individual stroke of the pertinent individual adjustment device 11 to an amount greater than that of the effective opening stroke H in the pertinent seat cleaning process. On the other hand, this stop is also suitable for producing the systematic effective opening stroke within the framework of the process proposed by causing the individual adjustment device to come into contact with this stop.

I claim:

1. A process for cleaning the seats of a double seat valve having two independently movable closing elements, each of the closing elements being associated with a respective one of the valve seats, which closing elements can be moved into simultaneous fully open positions when the double seat valve is in an open state, and at least one of the closing elements is movable to a partly open position independently of the other closing element, in which partly open position a passage is defined between said at least one closing element and the seat associated with said at least one closing element, said process involving flow of a cleaning agent, said process comprising:

periodically alternately moving said at least one closing element to the partly open position and reversing the moving to move said at least one closing element to the closed position in partial stroke movements, the reversing of partial stroke movements of the closing elements from opening to closing movement and from closing to opening movement is done by a control unit in response to a passage of time.

2. A process as claimed in claim 1, wherein a stroke-time pattern of the opening movement and a stroke-time pattern of the closing movement are set as desired and independently of each other.

3. The process according to claim 1, wherein the partial stroke movements of said at least one closing element are reversed by a main control unit outside the double seat valve.

4. The process of claim 1, wherein the partial stroke movements of said at least one closing element are reversed by a control unit associated exclusively with the double seat valve.

5. A process for cleaning the seats of a double seat valve having two independently movable closing elements, each of the closing elements being associated with a respective one of the valve seats, which closing elements are movable into simultaneous fully open positions when the double seat valve is in an open state, and at least one of the closing elements is movable into a partly open position independently of the other closing element, in which partly open position a passage is defined between said at least one closing element and the seat associated with said at least one closing element, said process involving flow of a cleaning agent, said process comprising:

periodically alternately moving said at least one closing element to the partly open position and reversing the moving to move said at least one closing element to the closed position in partial stroke movements, the reversing of partial stroke movements of said at least one closing element from opening to closing movement and from closing to opening movement is done in response to the closing elements attaining specific positions.

6. The process of claim 5, wherein the attaining of the specific positions by said at least one closing element is detected by directly sensing the positions of said at least one closing element.

7. The process of claim 5, wherein the attaining of the specific positions by said at least one closing element is detected indirectly by sensing a physical quantity associated with the positions of said at least one closing element.

8. The process of claim 7, wherein the closing elements are moved by adjustment devices operated by a pressure medium, and the physical quantity is the pressure of the pressure medium for the adjustment devices.

9. A process for cleaning the seats of a double seat valve having two independently movable closing elements, each of the closing elements being associated with a respective one of the valve seats, which closing elements are movable into simultaneous fully open positions when the double seat valve is in an open state, and at least one of the closing elements is movable into a partly open position independently of the other closing element, in which partly open position a passage is defined between said at least one closing element and the seat associated with said at least one closing element, said process involving flow of a cleaning agent, said process comprising:

periodically alternately moving said at least one closing element to the partly open position and reversing the moving to move said at least one closing element to the closed position in partial stroke movements, the reversing of partial stroke movements of said at least one closing element from opening to closing movement and from closing to opening movement is done as a function of the flow of cleaning agent.

10. The process of claim 9, wherein the flow of cleaning agent has a direction and the partial stroke movements of said at least one closing element are reversed as a function of the flow of cleaning agent at a point beyond the valve seat to be cleaned, as viewed in the direction of flow.

* * * * *